Jan. 10, 1956  C. B. POST ET AL  2,730,443
GLASS SEALING ALLOY
Filed Nov. 10, 1951
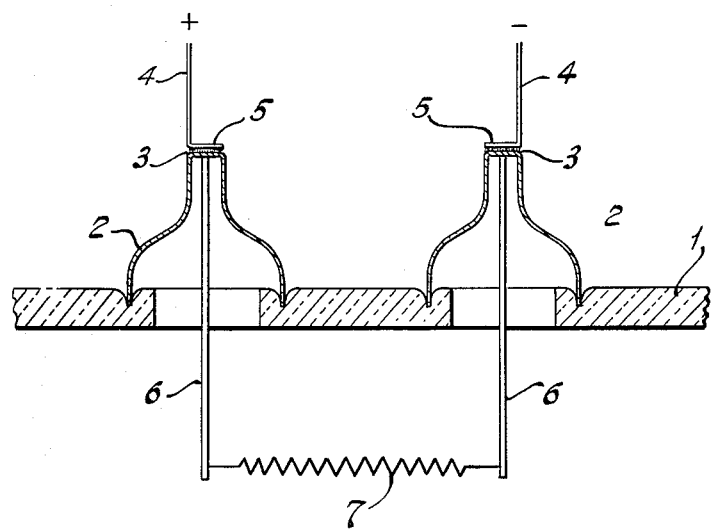
INVENTORS:
CARL B. POST
WARREN S. EBERLY.
BY
Joseph V. Meigs
ATTORNEY.

United States Patent Office 2,730,443
Patented Jan. 10, 1956

2,730,443

GLASS SEALING ALLOY

Carl B. Post, Wyomissing, and Warren S. Eberly, Temple, Pa., assignors to The Carpenter Steel Company, Reading, Pa., a corporation of New Jersey Application November 10, 1951, Serial No. 255,808

1 Claim. (Cl. 75—123)

This invention relates to iron-nickel-titanium alloys and is an improvement in respect of the invention of our U. S. Patent 2,471,079, issued May 24, 1949, to which reference is made.

It has been found that by substituting titanium, within a certain restricted range of proportions thereof, for the columbium of that patent, that equivalent glass sealing properties are achieved along with an improvement in surface characteristics permitting the wetting of the surface by very low melting alloys, e. g. solder.

The present invention will be defined in the claim and further described by reference to the accompanying drawing which shows diagrammatically a portion of a type of glass-to-metal seal commonly employed in manufacturing incandescent lamps, e. g. sealed beam headlights.

The filament 7 is carried by pins 6 supported by corresponding ferrules 2 having cap portions 3, the ferrules 2 being sealed into the glass 1 as indicated. Electrical connection is obtained by lugs 4 having base portions 5 bonded to the ferrules by means of a low temperature melting solder, e. g. alloy of lead and tin.

In accordance with the invention of U. S. Patent 2,471,079 the ferrules are made of the iron-nickel-columbium alloy therein described and claimed and the advantages of that alloy are obtained. However, it has been found by production experience that the bond between the solder and the surface of the ferrule for joining the lugs 4 to the ferrules presented difficulty due to the weakness of the bond. The weakness of the bond is due to surface characteristics that lead to poor wetting by the solder. This resulted in the dilemma of either experiencing an unduly high proportion of rejects or employing unduly expensive surface treatments to obtain satisfactory wetting.

By employing titanium as herein described all the advantages of the columbium alloy are retained and the above mentioned disadvantage is obviated and an improved "non-gassing" alloy thereby obtained. The improvement resides particularly in imparting a new and unexpected property, that is, the wetability of the alloys by low melting (lead-tin) solders commonly used to join other metallic parts to the ferrules.

Illustrative examples of the invention are shown by the following analyses:

| Analysis No. | 1 | 2 | 3 | 4 | 5 |
|---|---|---|---|---|---|
| Carbon | .046 | .034 | .04 | .055 | .05 |
| Manganese | .54 | .38 | .65 | .91 | .87 |
| Silicon | .32 | .19 | .42 | .39 | .49 |
| Nickel | 40.41 | 41.30 | 41.0 | 40.42 | 40.42 |
| Titanium | 0.45 | .54 | .63 | .30 | .70 |

The above values show percentages by weight and the balance is iron except incidental impurities.

Generically the invention is defined by the following range of composition:

| | |
|---|---|
| Carbon | nil to 0.7 |
| Manganese | .50 to 2.00 |
| Silicon | .25 to 1.00 |
| Nickel | 30 to 60 |
| Titanium | 0.30 to 0.70 |

The 0.30 and 0.70 range for titanium is critical in the fact that amounts below the minimum do not render the alloy gas-free, and amounts in excess of the maximum alter the expansion characteristics. The balance is iron except incidental impurities.

What is claimed is:

An alloy having the following composition, in per cent by weight

| | |
|---|---|
| Carbon | nil to 0.07 |
| Manganese | .50 to 2.00 |
| Silicon | .25 to 1.00 |
| Nickel | 30.0 to 60.0 |
| Titanium | 0.30 to 0.70 | the balance being iron and incidental impurities, said alloy being substantially gas-free at a glass-to-alloy interface during glass sealing operations at temperatures in the range of 1700° to 2200° F., and being readily wetted by low melting soldering alloys.

References Cited in the file of this patent

UNITED STATES PATENTS

| 1,480,706 | Yensen | Jan. 15, 1924 |
| 2,048,163 | Pilling et al. | July 21, 1936 |
| 2,471,079 | Post | May 24, 1949 |
| 2,513,241 | Holst | June 27, 1950 |

FOREIGN PATENTS

| 556,372 | Germany | Aug. 6, 1932 |